July 21, 1964
H. S. WYNN
3,141,526
TRACKWAY DEVICE FOR GOVERNING THE SPEED
OF FREE ROLLING RAILWAY CARS
Filed May 4, 1962
2 Sheets-Sheet 1
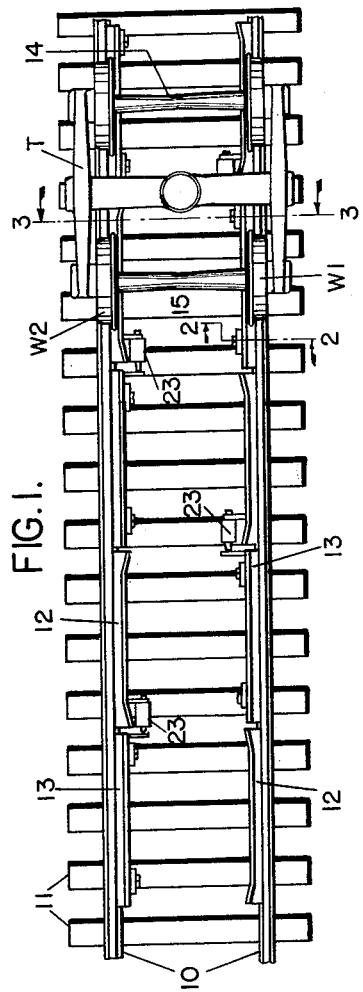
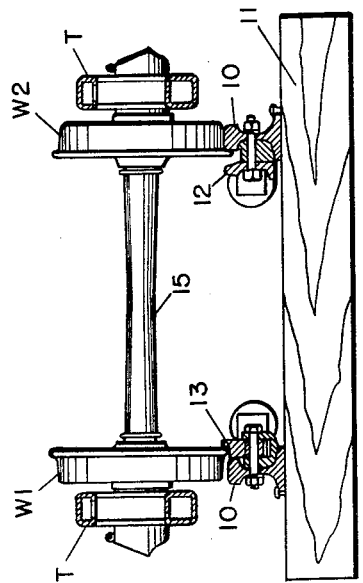
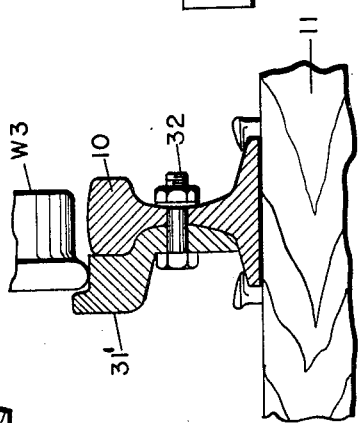
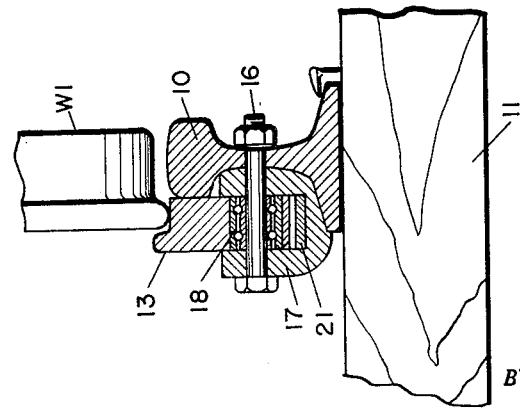
INVENTOR.
H.S. WYNN
BY
Forrest B. Hitchcock
HIS ATTORNEY July 21, 1964

H. S. WYNN 3,141,526

TRACKWAY DEVICE FOR GOVERNING THE SPEED
OF FREE ROLLING RAILWAY CARS

Filed May 4, 1962

INVENTOR.
H.S.WYNN
BY
Forest B. Hitchcock
HIS ATTORNEY

United States Patent Office 3,141,526
Patented July 21, 1964

3,141,526
TRACKWAY DEVICE FOR GOVERNING THE
SPEED OF FREE ROLLING RAILWAY CARS
Harold S. Wynn, Pittsford, N.Y., assignor to
General Signal Corporation
Filed May 4, 1962, Ser. No. 192,421
19 Claims. (Cl. 188—62)

The present invention relates to a trackway device for governing the speed of free rolling railway cars, and it more particularly pertains to a device in a trackway for applying torsional force to the wheels of railway cars as they pass over the device to govern the speeds of cars.

A railway car standing on a railway track could be made to move in one direction or another if one of track rails could be moved longitudinally relative to the other track rail to set up a torsional force through the wheels and their associated rigid axles. Such movement would be without slippage of any of the wheels as if all of the wheels were geared to the track rails. Similarly, if a car were in motion when one rail is moved longitudinally relative to the other, the car would be accelerated or decelerated, dependent upon the direction of rail movement, to an extent dependent upon the rate of movement of the track rail.

If the wheels on a rigid axle of a railway car were of different diameters, the axle would not roll freely because the wheels of smaller diameter will not cover the same distance per revolution as the wheel of larger diameter. As a result, the wheel of smaller diameter would be slipped on the track rail by the wheel of larger diameter, provided that the axle were not permitted to turn sideways. This slippage would provide a braking effect on the car. Thus if one wheel of each axle of a car were made to ride on its flange while the other wheel were riding on its normal rim, there would be a tendency for the wheel riding on its flange to travel farther per revolution than the other wheel on the same axle, thus tending to turn the axle sideways and/or slip the other wheel. The system according to the present invention employs the above described principles to decelerate or accelerate free rolling railway cars.

Without attempting to define the scope of the present invention, the present invention provides a car retarder comprising shoes secured inside the track rails at selected positions for the flanges of car wheels to ride on while the other wheels of the axles ride normally on the opposite rail. A reverse torque is set up in each axle because the wheel riding on its flange tries to travel farther per revolution than the other wheel on the same rigid axle.

To prevent an axle, and its associated car truck, from being turned side ways by one wheel riding on a shoe on its flange, the shoes are made of a length substantially comparable to the spacing of the axles in a car truck, and the shoes are associated with the respective track rails in staggered relationship on the inside of the two track rails in such a maner that only one wheel of each axle of a car truck is supported on one shoe at one time. That is, the wheel on one side of the first axle of a car truck rides on a shoe associated with one rail at the same time that a wheel on the other side of the second axle rides on a shoe associated with the other rail.

This structure provides a tendency for the effectively larger diameter wheels on both axles of a car truck to turn the entire axles sideways, but because of the shoes for the different axles of a truck being on opposite rails, the tendency is to turn the axles of a truck in opposite directions at the same time so that there is no actual turning of the car trucks. Thus the wheels of both axles provide braking due to the slippage and setting up of a reverse torque to an extent dependent upon the effective differences in diameter of the wheels of each axle. This is effective to decelerate the cars.

It is also provided according to the present invention that additional torque for braking may be obtained by providing for longitudinal movement of the shoes relative to the opposite track rails in the direction of traffic as a car passes through the retarder. One manner in which the shoes may be moved longitudinally during passage of a car for providing additional retardation, for example, is provided responsive to the weight bearing on the respective shoes. If the shoes are caused to be operated longitudinally in a direction opposite to the direction of traffic upon passage of a car, the trackway device is operable as a car accelerator because the torque set up in the car axles due to the longitudinal movement is in the same direction as the direction of rotation.

An object of the present invention is to provide a car speed control device wherein one wheel of each axle of a car is made to ride on its flange to provide reverse torque braking based on the effective difference in diameter of one wheel riding on its flange and the other wheel of the same axle riding normally on its rim.

Another object of the present invention is to provide shoes secured in staggered relationship on the inside of both of the track rails and so disposed as to cause wheels on opposite sides of the front and rear axles respectively of a car truck to ride on their flanges while the wheels on the other sides of the associated axles ride normally on the track rails.

Another object of the present invention is to provide a shoe on the inside of one of the track rails for a wheel flange to ride on the shoe being movable longitudinally relative to its associated track rail.

Another object of the present invention is to provide means powered by car weight on a shoe for moving the shoe longitudinally and thereby setting up a torque in the car axle to govern the speed of the car.

Other objects, purposes and characteristic features of the present invention will be in part obvious from the accompanying drawings and in part pointed out as the description of the invention progresses.

In describing the invention in detail, reference is made to the accompanying drawings wherein similar reference characters are used to designate similar parts throughout the several figures; and in which:

FIG. 1 is a plan view of a trackway device constructed according to the present invention for acting as a car retarder;

FIG. 2 is an enlarged view of a part of the car retarder of FIG. 1 shown partly in cross section which is taken along the section line 2—2 of FIG. 1;

FIG. 3 is an enlarged sectional view of the car retarder of FIG. 1 taken along the section line 3—3 of FIG. 1;

FIG. 5 is a view partly in cross section of a modified form of the present invention having a fixed shoe disposed on the inside of a track rail.

Figure 4:
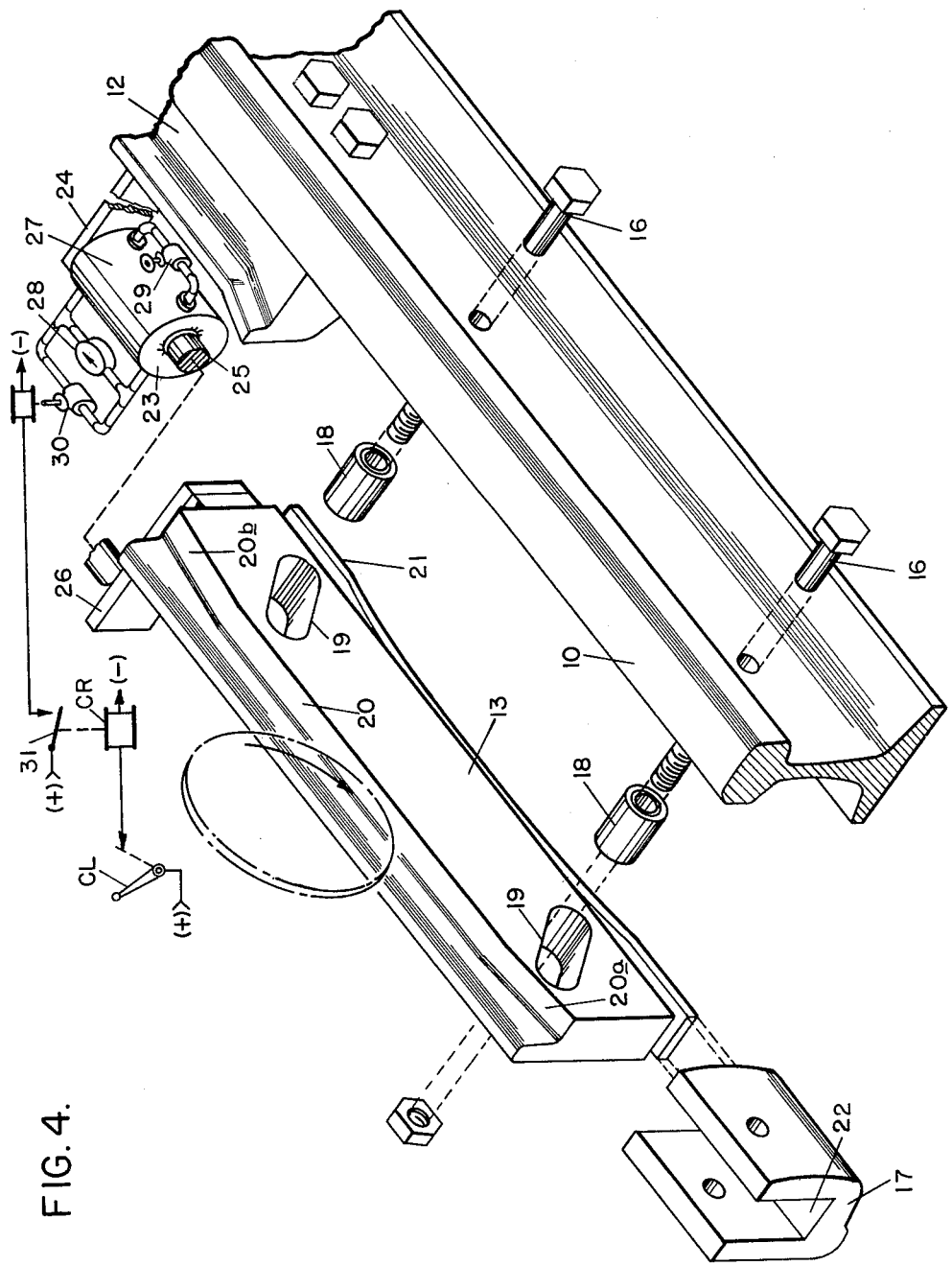
FIG. 4 is an exploded view in perspective of a portion of the trackway device shown in FIG. 1 relating particularly to the details involved in the structure and operation of one of the shoes.

With reference to FIG. 1, a stretch of trackway is illustrated having track rails 10 secured to railway ties 11. Secured to the inside of each of the rails 10 end to end and in alternate relationship are guard rails 12 and shoes 13. The guard rails 12 and the shoes 13 are of substantially the same length, and the length is substantially equivalent to the spacing of the first and second axles 14 and 15 of a railway truck T. Each of the shoes 13 is disposed opposite a guard rail 12 the guard rail 12 being provided particularly to guide the car wheels while one wheel is supported on its flange on a shoe 13 and is raised off of the associated rail 10.

With reference to FIG. 2, the wheel W1 is illustrated as riding on its flange on a shoe 13. The shoe 13 is secured to the inside of a track rail 10 by bolts 16 which pass through the track rail 10 and through U-shaped supporting brackets 17, which are preferably formed to bear against the inner surface of the track rail 10, having inner openings for receiving the shoe 13. The shoe 13 is supported on the bolts 16 through radial antifriction bearings 18, which are operable longitudinally within diagonal slots (see FIG. 4) 19 formed through the shoe 13. Thus the shoes 13 move both vertically and longitudinally at the same time within the U-shaped supporting brackets 17.

Thus it is provided that as a car passes through the trackway device having the shoes and guard rails disposed as is illustrated in FIG. 1, one wheel of each axle is always riding on a shoe 13 while the other wheel W2 (see FIG. 3) is maintained on the track rail 10 by a guard rail 12.

With reference to FIG. 4, each of the shoes 13 is provided with a bearing surface 20 upon which the flanges of the car wheels ride, this bearing surface having tapered end portions 20a and 20b at the respective entering and leaving ends of the shoes so that each wheel will ride smoothly onto the shoe 13, and the shoe 13 will be restored to its normal position elevationally as a wheel leaves the shoe by a restoration leaf spring 21 disposed beneath the shoe. The leaf spring 21 bears on the inner surface 22 of the U-shaped brackets 17.

The longitudinal slots 19 in the shoes 13 are disposed at an angle selected to provide the desired amount of longitudinal force in the direction of traffic when a wheel is present on the shoe so that maximum torque can be set up in the car axle without slippage of the wheel on the surface 20 of the shoe 13. The length and angle of the slots 19 determine also the extent of longitudinal movement that can be provided by the shoe 13 relative to the track rail 10. As it is desirable to provide as much longitudinal movement as possible, the slots 19 should be made relatively long.

Dash pots 23 have been shown in FIGS. 1 and 4 for the purpose of controlling the rate of longitudinal movement of the shoes 13, one dash pot 23 being illustrated as being provided for each shoe 13. Each of the dash pots 23 is supported by a suitable bracket 24 (see FIG. 4) which is secured to the left-hand end of a guard rail 12. Each dash pot has a plunger 25 which is connected through a suitable linkage such as a universal joint (not shown) to a bracket 26 which is secured to the right-hand end of an adjoining shoe 13.

Each dash pot 23 is controlled to permit quick restoration of the associated shoe 13 to its normal raised position after a car wheel passes over the shoe 13, the plunger 25 being extended under these conditions either by the longitudinal movement of the shoe 13 or by a suitable spring (not shown) which may be contained within the cylinder 27 of the dash pot. Quick actuation of the plunger 25 to its extended position is permitted by a check valve 28 which permits fluid to flow readily in one direction around the piston 25 within the cylinder 27 The rate of longitudinal movement of the shoe 13, and thus the rate of deceleration provided by the retarding device is adjustable by a valve 29 which governs the flow of fluid around the piston 25 within the cylinder 27. The setting of this valve determines the rate of longitudinal movement permitted by the shoe 13.

It is also illustrated in FIG. 4 that the car retarder can be remotely controlled, after closing the valve 29 in accordance with the control of an electrically operated valve 30 which is connected in multiple with the valve 29. The valve 30 is closed when its associated winding is deenergized, and the actuation of a suitable control lever, or other control devices, to its right-hand position is effective to energize a control relay CR, which in turn, upon closure of its front contact 31 provides for the energization of the electrically operated valve 30 to open the valve and permit the longitudinal movement of the shoe 13. If it is desired to materially limit the amount of retardation provided, the valve 30 is maintained closed, and the manually operable valve 29 is maintained closed and thus no movement of the piston 25 is permitted and the shoe 13 cannot be operated longitudinally in the direction of traffic. Under these circumstances the only braking provided is that which is dependent upon the effective difference in diameter of the wheels of the two rails because of the wheels on the shoe 13 riding on its flange.

It is to be understood that the dash pots 23, or similar devices, may not be required in practice where the retarder is not to be controlled, and it is desired that the same degree of retardation, dependent upon car weight, should always be provided. Under these conditions, the longitudinal movement of the shoes 13 is at a rate in accordance with the rate of deceleration of the car, and the friction contact of the flanges of the car wheels on the surface 20 of each shoe 13 prevents the quick dropping of the shoe due to the presence of a car. This is because the longitudinal movement of the shoe is limited to the rate of deceleration of the car, assuming that the longitudinal force applied is less than the force that would provide slippage of the wheels on the surface 20.

As has been pointed out, a braking force is also provided due to the effective difference in diameters of the wheels of each axle when one wheel rides on its flange on a shoe 13. It may be that this operation will provide sufficient braking for certain applications in practice without longitudinal movement of the shoes 13. Therefore the structure of the shoes 13 can be simplified in that the longitudinal slots 19 are no longer required.

One simplified structure of the shoes where longitudinal movement is not required is shown in the modified form of the invention according to FIG. 5 wherein the track rail 10 is illustrated as having a shoe 31' rigidly secured thereto by bolts 32, the shoe 31' being constructed so as to support a wheel W3 on its flange during passage of a car. The same problem exists relative to the turning of the car trucks with this structure as has been heretofore considered and thus it is preferable that the modification according to FIG. 5 be applied by making the shoes 31' of a length substantially comparable to the spacing of the axles of a car truck and to be provided along the trackway alternately with guard rail sections along both rails in staggered relationship as is shown for the use of longitudinally movable shoes 13 in FIG. 1.

Having thus described specific embodiments of a trackway device for governing the speed of free rolling railway cars, it is desired to be understood that these embodiments have been described more by way of illustration of the features of the invention than to show the specific construction and arrangement of parts that may be required in practice. Thus it is to be understood that various alterations, modifications and adaptations may be applied to the specific form shown to meet the requirements of practice within the scope of the present invention as defined by the appended claims.

What I claim is:
1. A railway car decelerating device in a stretch of railway track for cars having multiple trucks comprising:
  (a) at least one shoe secured to the inside of each of the track rails,
  (b) each of said shoes being disposed in a position to support a flange of a car wheel and thereby raise the car wheel off of the associated track rail,
  (c) each of said shoes being of a length substantially comparable to the spacing of the axles of a railway car truck,
  (d) and said shoes for the two rails being disposed in staggered relationship along the stretch of track,
  (e) whereby only one wheel of each axle of a car truck is supported on a shoe at one time and wherein the wheel on one side of a first axle of the car truck rides on a shoe associated with one rail at the same time a wheel on the other side of a second axle of the car truck rides on a shoe associated with the other rail.

2. A railway car deceleration device according to claim 1 wherein means is provided for moving the shoes longitudinally in the direction of traffic upon the passage of a car through the deceleration device.

3. A railway car deceleration device according to claim 1 wherein at least one guard rail is secured to the inside of each of the track rails at a position directly opposite at least one shoe respectively secured to the other track rail.

4. A railway car deceleration device according to claim 2 wherein the longitudinal movement of the shoes is powered by the weight bearing on the shoes upon passage of a car.

5. A railway car deceleration device according to claim 2 wherein means is provided for controlling the rate of longitudinal movement of the shoes.

6. A railway car speed control device in a stretch of railway track for cars having multiple axle trucks comprising:
   (a) at least one shoe secured to the inside of one of the track rails,
   (b) each of said shoes being disposed in a position to support the flange of a car wheel and thereby raise the car wheel off of the associated track rail,
   (c) means for actuating each of said shoes longitudinally relative to the trackway during passage of a car wheel over the shoe,
   (d) and at least one guard rail secured to the inside of the other track rail opposite each of said shoes respectively.

7. A railway car speed control device according to claim 6 wherein each of the shoes and each of the guard rails is of a length substantially comparable to the spacing between axles of a car truck and shoes and guard rails are alternately disposed along both of the track rails so that a wheel on one axle of the truck rides on a shoe associated with one track rail at the same time that a wheel on another axle of the truck rides on a shoe associated with the other track rail.

8. A railway car retarder in a stretch of railway track for cars having two axle trucks comprising:
   (a) a plurality of shoes and guard rails secured alternately along the insides of both of the track rails,
   (b) said shoes and guard rails each being of a length substantially comparable to the wheel base of a railway car truck,
   (c) said shoes being disposed in a position to support a flange of a car wheel and thus raise the car wheel off of the associated track rail, and
   (d) means for moving said shoes longitudinally relative to the associated track rails in the direction of traffic while supporting a car wheel.

9. A railway car retarder according to claim 8 wherein the longitudinal movement of the shoes is powered by the weight of a car passing over the shoes.

10. A railway car retarder according to claim 9 wherein each of the shoes is secured to the inside of the associated track rails by a plurality of bolts passing through a plurality of slots extending diagonally in that shoe.

11. A railway car retarder according to claim 8 wherein the shoes have ramp portions at the entering and leaving ends of the shoes respectively for smoothly raising and lowering a car wheel relative to the associated track rail.

12. A railway car retarder in a stretch of railway track comprising:
   (a) at least one shoe secured to the inside of at least one of the track rails,
   (b) each of said shoes being disposed in a position to support the flange of a car wheel and thereby raise the car wheel off of the associated track rail,
   (c) means for moving each of said shoes longitudinally relative to the associated track rail in the direction of traffic while supporting a car wheel, and
   (d) means for governing the rate of longitudinal movement of each of the shoes.

13. A railway car retarder according to claim 12 wherein said means for governing the rate of longitudinal movement of the shoes includes a hydraulic device having a hydraulic cylinder.

14. A railway car retarder according to claim 13 wherein a hydraulic control system is provided for said hydraulic device for adjusting the rate of longitudinal operation of the associated shoes.

15. A railway car retarder according to claim 12 wherein said means for governing the rate of longitudinal movement of the shoes includes remote control apparatus for selectively changing the rate of longitudinal movement.

16. A railway car retarder according to claim 15 wherein said control apparatus includes a hydraulic system including a remotely controlled valve which is operable to selectively permit or prevent longitudinal movement of the shoes.

17. A railway car speed control device in a stretch of railway track comprising:
   (a) at least one shoe secured to the inside of at least one of the track rails,
   (b) each of said shoes being disposed in a position to support a flange of a car wheel and thereby raise the car wheel off of the associated track rail, and
   (c) means responsive to the weight of a car on each of said shoes for moving that shoe longitudinally relative to the associated track rail from a normal position in the direction of traffic while fully supporting a car wheel.

18. A railway car speed control device according to claim 17 wherein restoration means is provided along the trackway for restoring said shoe to said normal position when said shoe is not supporting a car wheel.

19. A railway car speed control device according to claim 18 wherein said restoration means is powered by a spring adjoining the shoe.

References Cited in the file of this patent

UNITED STATES PATENTS 2,559,392    Bone _____ July 3, 1951

FOREIGN PATENTS 784,543    Great Britain _____ Oct. 9, 1957